United States Patent
Beukema et al.

(10) Patent No.: US 7,496,753 B2
(45) Date of Patent: Feb. 24, 2009

(54) DATA ENCRYPTION INTERFACE FOR REDUCING ENCRYPT LATENCY IMPACT ON STANDARD TRAFFIC

(75) Inventors: Bruce L. Beukema, Hayfield, MN (US); Jamie R. Kuesel, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 10/932,943

(22) Filed: Sep. 2, 2004

(65) Prior Publication Data

US 2006/0047975 A1 Mar. 2, 2006

(51) Int. Cl.
*G06F 9/00* (2006.01)
(52) U.S. Cl. .............. 713/165; 713/166; 713/167; 713/193
(58) Field of Classification Search ............ 713/165, 713/166, 167, 193
See application file for complete search history.

(56) References Cited

U.S. PATENT DOCUMENTS

| | | | | |
|---|---|---|---|---|
| 5,191,611 A | * | 3/1993 | Lang | 705/53 |
| 5,337,357 A | * | 8/1994 | Chou et al. | 705/56 |
| 5,563,946 A | * | 10/1996 | Cooper et al. | 705/56 |
| 5,757,919 A | * | 5/1998 | Herbert et al. | 713/187 |

* cited by examiner

*Primary Examiner*—Thomas R Peeso
(74) *Attorney, Agent, or Firm*—Patterson & Sheridan LLP

(57) ABSTRACT

Methods and apparatus that may be utilized in systems to reduce the impact of latency associated with encrypting data on non-encrypted data are provided. Secure and non-secure data may be routed independently. Thus, non-secure data may be forwarded on (e.g., to targeted write buffers), without waiting for previously sent secure data to be encrypted. As a result, non-secure data may be made available for subsequent processing much earlier than in conventional systems utilizing a common data path for both secure and non-secure data.

5 Claims, 4 Drawing Sheets

DATA ENCRYPTION INTERFACE FOR REDUCING ENCRYPT LATENCY IMPACT ON STANDARD TRAFFIC

CROSS-REFERENCE TO RELATED APPLICATIONS

This application is related to commonly assigned co-pending application entitled "Low-Latency Data Decryption Interface" U.S. Ser. No. 10/932,727 filed herewith and hereby incorporated by reference in its entirety.

BACKGROUND OF THE INVENTION

1. Field of the Invention

The present invention generally relates to data encryption and, more particularly, to methods and apparatus for reducing latency associated with selectively encrypting portions of data.

2. Description of the Related Art

A system on a chip (SOC) generally includes one or more integrated processor cores, some type of embedded memory, such as a cache memory, and peripheral interfaces, such as memory control components and external bus interfaces, on a single chip to form a complete (or nearly complete) system.

As part of an enhanced security feature, some SOCs encrypt some portions of data prior to storing it in external memory. Adding such encryption to an SOC may add valuable benefits, such as preventing a hacker from obtaining instructions of a copyrighted program, such as a video game, or data that may be used to determine such instructions through reverse engineering. However, adding encryption typically impacts system performance, as conventional encryption schemes typically stream both data that is to be encrypted and data that is not to be encrypted (non-encrypted data) through a common sequential data path. As a result, non-encrypted data is typically suffers the same latency as encrypted data.

This latency may add significant delay to the storing of non-encrypted data. In addition, this latency may prevent the subsequent storage of non-encrypted data while previous data is being encrypted. Accordingly, what is needed is a mechanism to minimize performance impacts on non-encrypted data caused by encryption latency.

SUMMARY OF THE INVENTION

The present invention generally provides a method and apparatus that can improve the performance of systems with encrypted memory regions while ensuring that encrypted and non-encrypted data are correctly written to their respective memory locations.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention may be utilized in systems to reduce the impact that latency associated with encrypting data has on processing non-encrypted data. Rather than route both secure (to be encrypted) and non-secure (not to be encrypted) data along a common data path, secure and non-secure data may be routed independently. Thus, non-secure data may be forwarded on (e.g., to targeted write buffers), without waiting for previously sent secure data to be encrypted. As a result, non-secure data may be made available for subsequent processing much earlier than in conventional systems utilizing a common data path for both secure and non-secure data.

In the following description, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims

An Exemplary System

Figure 1:
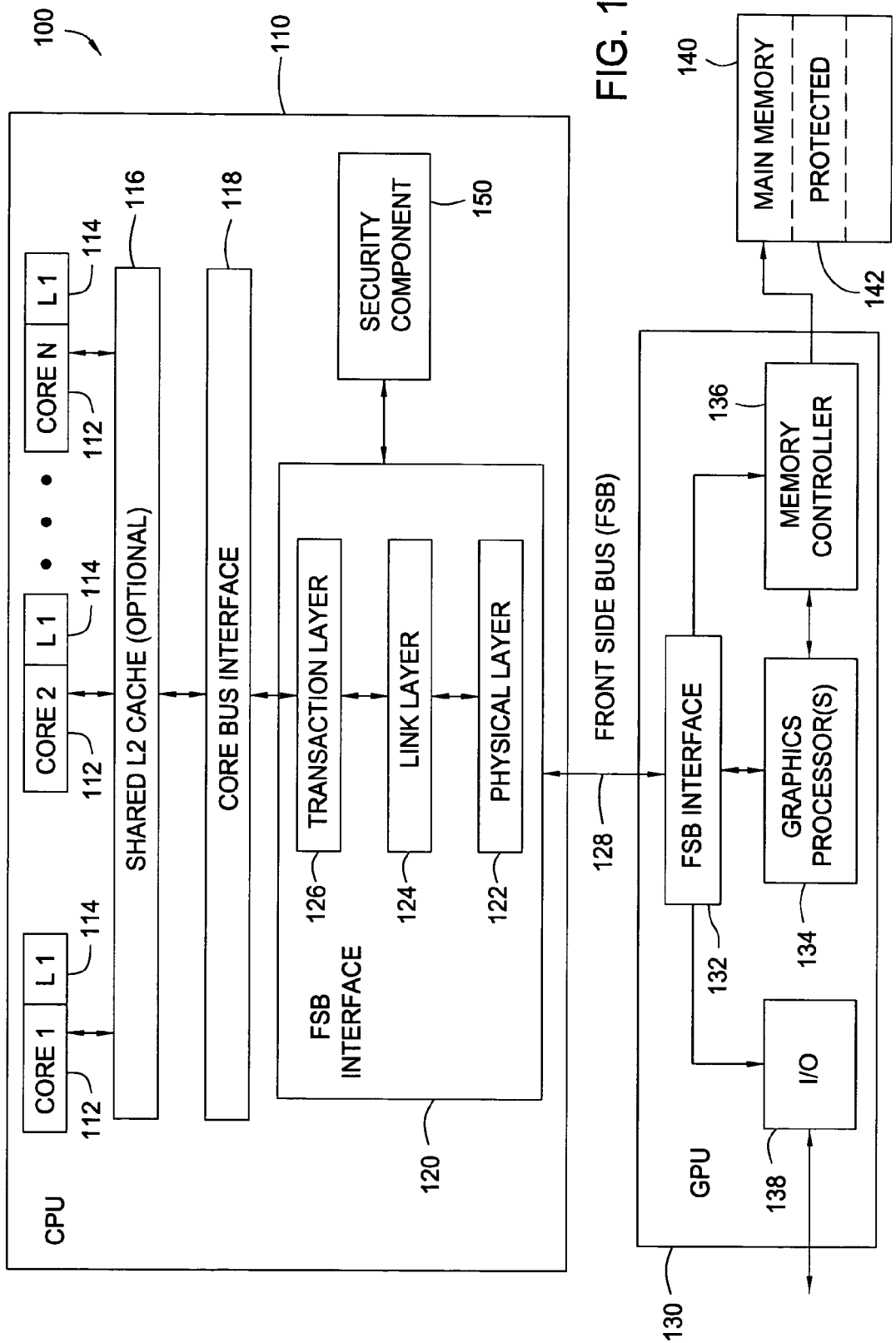
FIG. 1 illustrates an exemplary system including a central processing unit (CPU), in which embodiments of the present invention may be utilized.

Referring now to FIG. 1, an exemplary computer system 100 including a central processing unit (CPU) 110 is illustrated, in which embodiments of the present invention may be utilized. As illustrated, the CPU 110 may include one or more processor cores 112, which may each include any number of different type function units including, but not limited to arithmetic logic units (ALUs), floating point units (FPUs), and single instruction multiple data (SIMD) units. Examples of CPUs utilizing multiple processor cores include the PowerPC® line of CPUs, available from International Business Machines (IBM) of Armonk, N.Y.

As illustrated, each processor core 112 may have access to its own primary (L1) cache 114, and may optionally share a larger secondary (L2) cache 116. In general, copies of data utilized by the processor cores 112 may be stored locally in the L2 cache 116, preventing or reducing the number of relatively slower accesses to external main memory 140. Similarly, data utilized often by a processor core 112 may be stored in its L1 cache 114, preventing or reducing the number of relatively slower accesses to the L2 cache 116.

The CPU 110 may communicate with external devices, such as a graphics processing unit (GPU) 130 and/or a memory controller 136 via a system or frontside bus (FSB)

128. The CPU 110 may include an FSB interface 120 to pass data between the external devices and the processing cores 112 (through the L2 cache) via the FSB 128. An FSB interface 132 on the GPU 130 may have similar components as the FSB interface 120, configured to exchange data with one or more graphics processors 134, input output (I/O) unit 138, and the memory controller 136 (illustratively shown as integrated with the GPU 130).

As illustrated, the FSB interface 120 may include a physical layer 122, link layer 124, and transaction layer 126. The physical layer 122 may include hardware components for implementing the hardware protocol necessary for receiving and sending data over the FSB 128. The physical layer 122 may exchange data with the link layer 124 which may format data received from or to be sent to the transaction layer 126. As illustrated, the transaction layer 126 may exchange data with the processor cores 112 via a core bus interface (CBI) 118.

Figure 2:
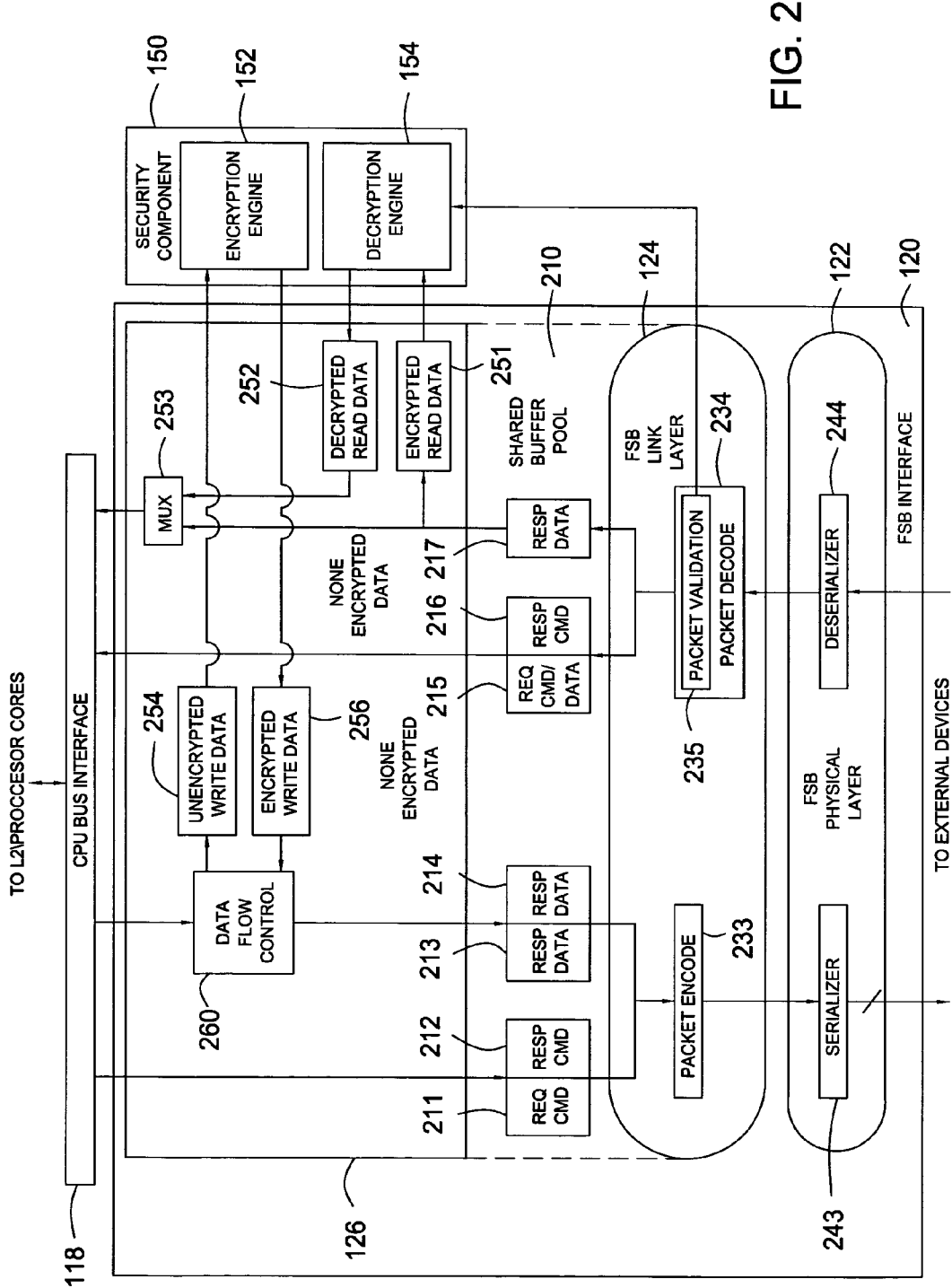
FIG. 2 is a block diagram of components of the CPU, according to one embodiment of the present invention.

As previously described, as part of an enhanced security feature, the CPU 110 may encrypt some portions of data, referred to herein as secure data, prior to storing it in main memory 140 (such encrypted portions of data are illustratively shown as protected data 142 in main memory 140). Accordingly, the CPU 110 may include a security component 150 used to encrypt such data prior to transmission over the FSB 128 by the FSB interface 120. Upon later retrieval of the encrypted data, the security component 150 may also be used to decrypt the encrypted data prior to passing it into the L2 cache 116 for use by one or more of the processor cores 112. As will be described in greater detail below, for some embodiments, the CPU 110 may include data flow control circuit configured to independently route secure data, to be encrypted prior to storage in main memory 140, to the security component 150 for encryption, while routing non-secure data around (bypassing) the security component As shown in FIG. 2, a number of data streams (also referred to as virtual channels) may be established to exchange data between the processor cores 112 and external devices. Establishing the separate streams may improve overall system performance, for example, allowing one processing core to transfer data while another processes data (and is not transferring data). As illustrated, the streams may share a common buffer pool 210, with each stream utilizing its own portion of the buffer pool 210, in effect establishing separate buffers 211-217.

For some embodiments, data may be sent over the FSB as packets. Therefore, the link layer 124 may contain circuitry, such as a packet encoder 233 configured to encode into packets or "packetize" data received from the transaction layer 126 and a packet decoder 234 to decode packets of data received from the physical layer 122. As shown, the physical layer 122 may include a serializer 243 and a de-serializer 244 for generating and receiving such packets, respectively. Typically, the packet decoder 234 will include a packet validation component 235 configured to check a received data packet for data transfer errors, for example, by comparing a checksum calculated on the received data with a checksum contained in the data packet.

The packet decoder 234 may forward received data to one or more receive buffers 215-217. As illustrated, some of the data, such as data request and response commands sent to buffers 215 and 216, may be non-encrypted and may, therefore, be passed directly to cache 116. Response data, on the other hand, may include both encrypted and non-encrypted data. While the non-encrypted data can be passed directly to cache 116, encrypted data 251 must first be decrypted. Therefore, the encrypted data 251 may be routed to the decryption engine 154.

The decryption engine 154 may decrypt the encrypted data 251 and pass back decrypted data 252. As illustrated, the decrypted data 252 may be merged with the non-encrypted data and passed to the cache 116 using a multiplexor circuit 253. For example, the decryption engine 154 may assert a signal to the multiplexor circuit 253 when decrypted data 252 is available to be passed to the cache 116. For some embodiments, the transaction layer 126 may include logic configured to pipeline received encrypted data 251 to the decryption engine 154 prior to receiving and validating the entire data packet. Such logic is described in detail in the commonly assigned and co-pending application entitled "Low-Latency Data Decryption Interface" (Ser. No. 10/932,727) filed herewith and hereby incorporated by reference in its entirety.

Reducing Encrypt Latency Impact on Standard Traffic

As previously described, secure data is encrypted prior to storing it externally, for example, in main memory 140. Accordingly, as shown in FIG. 2, the FSB transaction layer 126 may include data flow control circuit 260 configured to route unencrypted secure data 254 to an encryption engine 152. The encryption engine 152 may then return encrypted data 256 that the data flow control circuit 260 may then forward to write buffers 213. The packet encoder 233 may then access the encrypted data from the write buffers 213 and generate data packets to be sent out over the FSB via serializer 243.

The data flow control circuit 260 may be configured to receive and route both secure and non-secure data. While encryption operations may involve significant latency, the data flow control circuit 260 may be configured to route the secure and non-secure data independently in an effort to reduce the impact of encryption latency on the non-secure data. As illustrated, the data flow control circuit 260, in effect, provides different data paths from the CBI to the write buffers 213, with secure data routed along a first path (through the encryption engine 152) and non-secure data routed along a second path.

Figure 3:
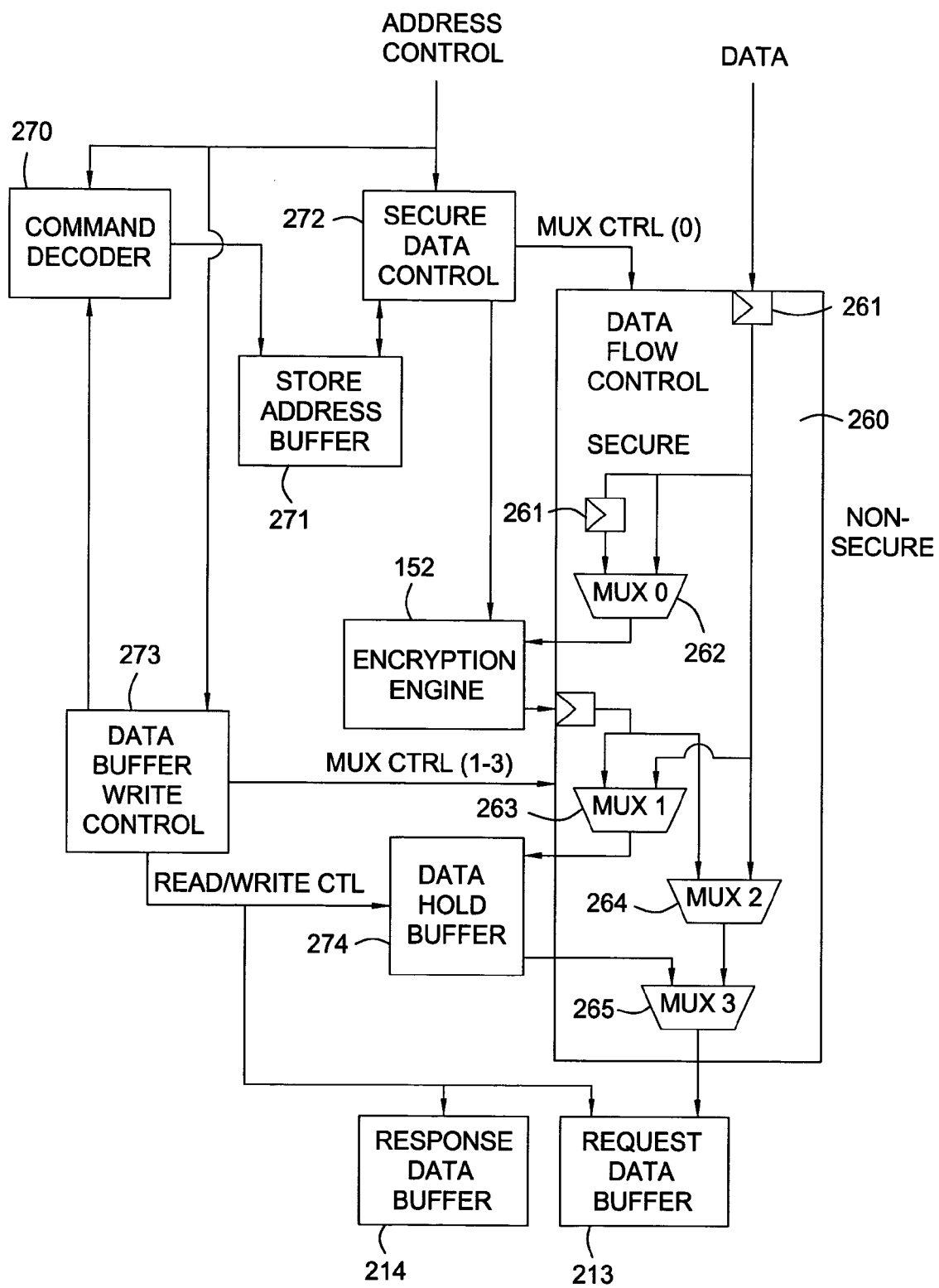
FIG. 3 is a block diagram of the encryption data path of the CPU, according to one embodiment of the present invention.

FIG. 3 illustrates one embodiment of the data flow control circuit 260 that may be utilized to independently route both secure and non-secure data via an arrangement of multiplexors 262-265 (MUX0-3). As illustrated, the data flow control circuit 260 may receive data from the CBI, for example, involved in store instructions issued by the processor cores. As illustrated, address and command data may be received by other components, such as a command decoder 270, secure data control circuit 272, and data buffer write control 273, that illustratively control operation of the data flow control circuit 260 (e.g., via signals that control the multiplexors 262-265).

Figure 4:
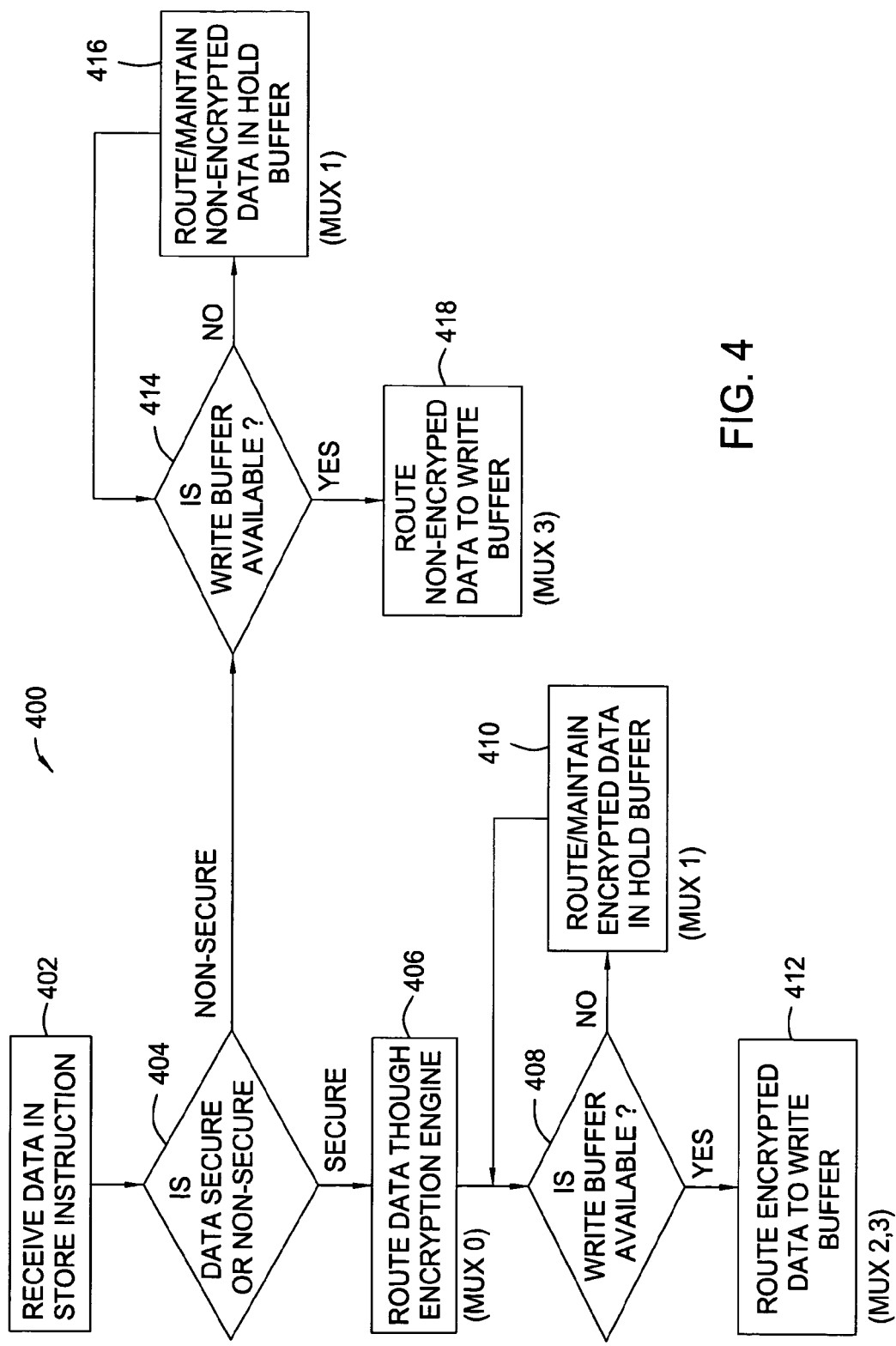
FIG. 4 is a flow diagram of exemplary operations for reducing latency associated with data encryption according to one embodiment of the present invention.

Operation of the data flow control circuit 260 via the multiplexors 262-265 may be described with simultaneous reference to FIG. 3 and FIG. 4 which illustrates exemplary operations 400 for independently routing secure and non-secure data. To facilitate understanding, the multiplexor(s) shown in FIG. 3 involved in one of the operations shown in FIG. 4 are listed below the operation. The operations 400 begin, at step 402, by receiving data involved in a store instruction. As illustrated, the data flow control circuit 260 may include latch circuitry 261 at various locations, to temporarily hold data received, until a required resource is available.

At step 404, a determination is made as to whether the data received is secure or non-secure. Any suitable technique may be utilized to determine if the data is secure. For example, a specific address range may be reserved for secure data. Accordingly, the secure data control 272 may identify secure data by examining the address of the instruction in which the data is involved. As another example, secure data may be identified by one or more bit settings in a page table entry, for example, indicating a corresponding cache line is secure.

If the data is secure, the data is routed through the encryption engine, at step 406. As illustrated in FIG. 3, secure data may be routed to the encryption engine via MUX0 262, which may be controlled by a signal generated by the secure data control circuit 272. In other words, in response to identifying the data as secure (e.g., based on the address to which the data is to be written), the secure data control circuit 272 may generate the mux control signal to route the data to the encryption engine 152. In some cases, optional latch circuitry 261 may be included to support an encryption engine whose latency is greater than the time to transfer a data packet.

Once the encrypted data is returned from the encryption engine 152, if a write buffer 213 targeted by the store instruction containing the secured data is available (i.e., that buffer is not already being written to), as determined at step 408, the encrypted data is routed to the available write buffer, at step 412. In other words, the arrays used for buffering typically only have a single write port. As a result, only one set of write data may get through at any given time. As illustrated, encrypted data from the encryption engine 152 may be routed directly to a write buffer 213 via MUX2 264 and MUX 3 265. In other words, regardless of the amount of latency involved in the encryption process, the encrypted data may be merged back in with the standard (e.g., unencrypted) data flow with little or no impact on the standard data flow.

However, if a targeted write buffer 213 is not available (i.e., that buffer is currently being written to), the encrypted data may be routed to a hold buffer 274, at step 410, where it may be maintained until a write buffer 213 is available. A targeted write buffer 213 may not be available because the data flow control circuit 260 may be routing other encrypted data or non-encrypted data to the targeted write buffer 213. Encrypted data may be routed from the encryption engine 152 to the data hold buffer 274 via MUX1 263. As illustrated, signals to control MUXs1-3 262-264 may be generated by the data buffer write control circuit 273, which may monitor the availability of the write buffers 213. In other words, the data buffer write control circuit 273 may maintain the encrypted data in the hold buffer 274 until a gap in traffic to the write buffers is detected. Once this gap is detected, data in the hold buffer 274 may be written to the write buffers 213.

Referring back to step 404, if the data received by the data flow control circuit 260 is non-secure, at step 418, the non-secure data may be routed directly to a targeted write buffer 213 if available, as determined at step 414. As illustrated, non-encrypted data may be routed directly to write buffers 213 via MUX2 264 and MUX 3 265. If a targeted write buffer 213 is not available, the non-secure/non-encrypted data may be routed to the hold buffer 274, at step 416, where it may be maintained until a write buffer 213 is available. As previously described, data may be routed from the data hold buffer 274 to the write buffers 213 via MUX 3 265.

Instruction Ordering

As described herein, by independently routing secure and non-secure data, even if secure data from a previously sent store instruction is being encrypted by the encryption engine 152, the non-secure data may be routed to the write buffers, with little or no impact due the encryption latency. Utilizing the circuitry described herein, encrypted data may be merged back in the standard traffic flow regardless of the number of latency cycles required for the encryption.

As a result, however, data may flow out of the data flow control circuitry 260 in a different order than it flows into the flow control circuitry 260. In other words, a subsequently issued store instruction involving non-secure data may exit the flow control circuitry prior to a previously issued store instruction involving secure data that must first be encrypted. For some embodiments, these instructions may be processed out of order while, for other embodiments, strict ordering may be enforced.

In any case, addresses for store instructions involving data passed to the encryption engine may be maintained to ensure proper system order checking for store and load instructions involving a common address (e.g., an address collision). In other words, if a store instruction to modify data at an address is followed by a load instruction to read data from the same address, logic may be configured to ensure the store instruction is issued prior to the load instruction to prevent the load instruction from reading invalid data. For some embodiments, the data buffer write control 273 may be configured to detect address collisions and signal the command decoder which may, for example, reschedule the load instruction.

Depending on the embodiment, the flow control logic described herein may be configured to process a different number of store commands before the first set of encrypted data is returned. For some embodiments, the flow control logic may be simplified to allow only one store instruction at a time through the encryption path, which may simplify the logic (e.g., requiring smaller buffers) and may be acceptable for applications with low bandwidth requirements for the encryption. For other embodiments, more complex circuitry may allow for a larger number of store instructions to be routed through the encryption path, which may serve to more fully isolate upstream logic from the performance limitations of the encrypt path.

CONCLUSION

By independently routing secure data (to be encrypted) and non-secure data (that is not to be encrypted), secure data involved in a store instruction may be routed to an encryption engine without holding up non-secure data involved in a subsequently issued store instruction. The encrypted secure data returned from the encryption engine may be later merged back with non-secure data. As a result, the latency impact on non-secure data associated with conventional encryption mechanisms may be reduced.

While the foregoing is directed to embodiments of the present invention, other and further embodiments of the invention may be devised without departing from the basic scope thereof, and the scope thereof is determined by the claims that follow.

What is claimed is:

1. A system on a chip (SOC), comprising:
one or more processor cores;
an encryption engine;
one or more write buffers; and
data flow control circuitry configured to route secure data involved in a first store instruction to the one or more write buffers through a first data path through the encryption engine, and to route non-secure data involved in a second store instruction issued subsequent to the first store instruction to the one or more write buffers through a second data path bypassing the encryption engine, wherein the non-secure data arrives at the one or more write buffers prior to the secure data.

2. The SOC of claim 1, wherein the data flow control circuitry is configured to determine data contained in a store instruction is secure based on an address contained in the store instruction.

3. The SOC of claim 1, further comprising a hold buffer for receiving secure data, in encrypted form, from the encryption engine.

4. The SOC of claim 3, wherein the data flow control circuitry comprises one or more multiplexors to selectively route secure data, in encrypted form, from the encryption engine to the one or more write buffers or the hold buffer, based on availability of the one or more write buffers.

5. The SOC of claim 3, wherein the data flow control circuitry comprises one or more multiplexors to selectively route non-secure data to the hold buffer, based on availability of the one or more write buffers.

* * * * *